June 12, 1945.       L. W. SCHAAFF         2,377,906
      NONMETALLIC MOLDED REPLACEABLE BLADE SHEARS
           Filed April 8, 1941      2 Sheets-Sheet 1
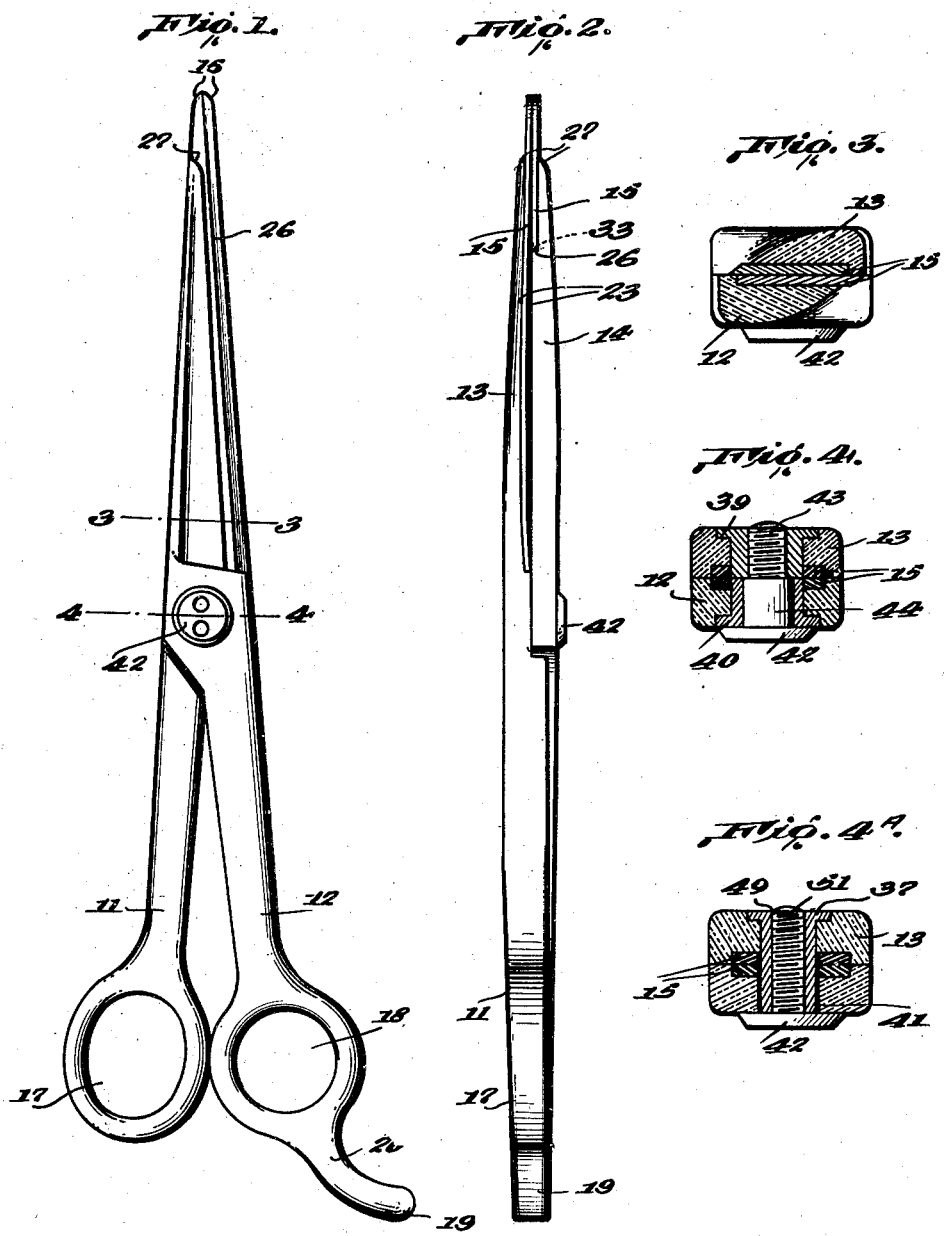
Louis W. Schaaff
INVENTOR.
BY
ATTORNEY

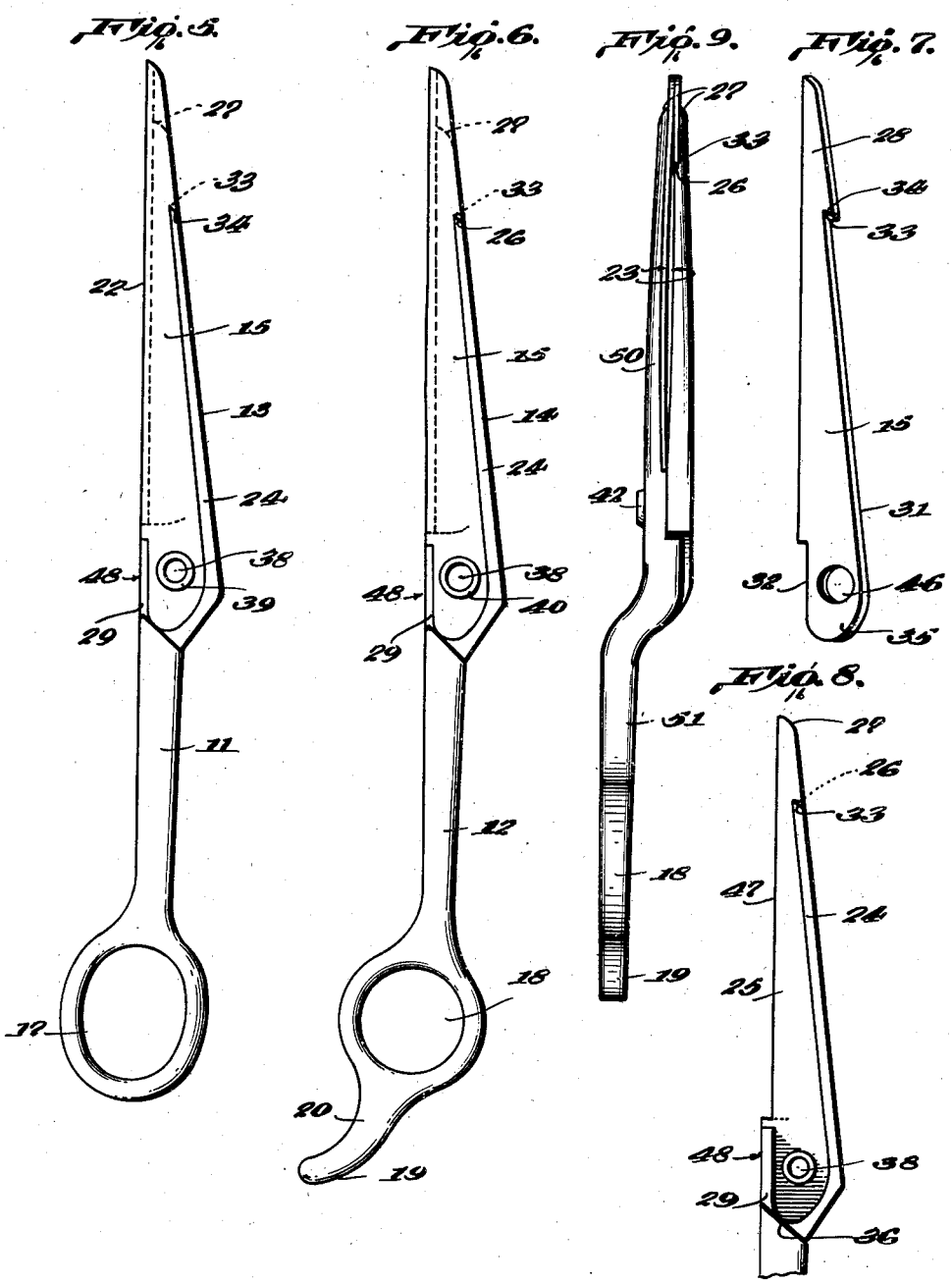

Patented June 12, 1945

2,377,906

UNITED STATES PATENT OFFICE 2,377,906

NONMETALLIC MOLDED REPLACEABLE BLADE SHEARS

Louis W. Schaaff, Jackson Heights, N. Y., assignor to Wilhelmina M. Kuhn, New York, N. Y.

Application April 8, 1941, Serial No. 387,389

5 Claims. (Cl. 30—349)

This invention relates to an improvement in shears and scissors of non-metallic-molded-synthetic-materials having replaceable blades and represents a continuation in part of my pending application under Serial No. 6,677 filed February 15, 1935.

The constant use to which shears are being put in households, in offices, in factories or in trade and professional endeavors makes the quality of cutting-power, sharpening and sharpness of paramount importance next to the actual use.

Taking as an illustration the metal shears as being used in connection with the barbering or beauticians trades, the cost of maintaining the shears in a fine cutting condition is a serious item of expenditure. Frequent sharpening eventually shortens the effective cutting edge until the shears are no longer fit for this particular use. Thus, the handle portion, is, of course, entirely wasted because after frequent sharpening, the shearing portions have become too short for use while the handle portions in respect to utility have remained practically as good as when they were new.

The subject of shears with replaceable blades has been one of prolific invention. However, so far as I am aware, the market has not seen a satisfactory replaceable blade shears notwithstanding prodigious inventive effort.

The principal reason for this condition is the fact that most constructions while mechanically possible proved from the commercial viewpoint un-economical and not very easy or safe to handle.

Another difficulty encountered has been the necessity of producing handles and bladeholders of a similar degree of interchangeability as has been achieved for example in the watch industry. Such interchangeability in replaceable blade shears could hitherto only be attained at excessive production costs because exact hand work and machine work were necessary in order to obtain a fair degree of uniformity and accuracy.

It is the object of this invention to provide replacable blade shears with handles and blade holding portions produced by the molding process and composed of synthetic plastic materials as used in connection with this production method.

Thus, and thus alone is it possible to produce bladeholding portions which are of the required mechanical strength and at once uniformly accurate to within permissible tolerances of measurements and cheap from the point of production cost.

By means of the molding process, bladeholders-shearhandles can be produced in one operation and in such a manner as to be practically in a finished state after molding and requiring only the touching off of the fin in one place.

It is another object of this invention to provide a pair of replaceable blades which can be inserted very safely into the molded shear portions with a minimum of effort or skill, requiring but the unscrewing of the fulcrum screw for inserting the blades or change them when they require replacing.

It is a further object of this invention to provide a pair of shears of the proper balance, lighter in weight than any heretofore produced size for size, shears that can be sterilized, do not rust, shears which owing to their physical characteristics are comfortable to the touch of the hand of the user, shears that do not break when dropped accidentally.

And it is a further object of this invention to provide an article of manufacture having wide practical utilitarian as well as artistic appeal.

In the accompanying drawings forming part of this specification and in which like numerals are employed to designate like parts throughout the same, Fig. 1 is a plan view of the improved detachable blade shears;

Fig. 2 is a side elevation of the shears shown in Fig. 1;

Fig. 3, Fig. 4 and Fig. 4—A are enlarged sections of the fulcrum on lines 3—3 and 4—4, respectively, of Fig. 1;

Fig. 5 and Fig. 6 are plan views of the two shear parts in disassembled condition, looking toward the inner or cooperating surfaces of the shear parts;

Fig. 7 is a perspective view of one of the replaceable blades;

Fig. 8 is a plan view of one of the shear parts with the blade removed; and

Fig. 9 is a side elevation of a modified form of the shear invention.

The improved replaceable-blade-shears, as illustrated in the drawings, comprise two cooperating parts or members, shown in disassembled condition in Figs. 5 and 6. The shear parts comprise the handle portions 11 and 12, the blade-holding portions 13 and 14 are integral with the handle portions 11 and 12, and the replaceable blades 15. One end of the handle 11 is provided with the elongated opening 17 adapted to receive the thumb of the right hand of the user, and the corresponding part of the handle portion 12 is provided with the round opening 18 adapted to receive the forefinger or the middle finger of the right hand of user. To provide greater leverage and more power for the cutting action, the extremity of the handle portion 12 is provided with a curved projecting lug 19 the concaved portion 20 of which is arranged for operation by the middle or ring finger of the user.

The handle portions and blade holding portions of the shears are preferably integral and molded from a synthetic substance such as phenolic base compound, preferably "Bakelite," producing hard, tough, strong and slightly flexible, or resilient handle and blade holding portions. The handle portions 11 and 12 are of such dimensions that they are substantially inflexible, whereas the blade holding portions 13 and 14 are relatively thinner longitudinally so that when molded with the proper degree of camber or curvature they cause the cutting edges 22 of the blade 15 to contact with each other in the shearing action proper when the shear parts are pivotally closed upon each other. The camber or curvature of the shear parts are indicated by the lines 23 in Figs. 2 and 9. The blades are preferably stamped from flat spring steel, and the only finishing required is in the beveling of barb 34 and beveling and sharpening the cutting edges 22.

The blade holding portions 13 and 14 of the shear parts are substantially identical in construction and arrangement, and the replaceable blades 15 are all identical, so that the blades 15 all fit snugly into either one of the blade holding portions 13 and 14 of the shear parts. To keep the replaceable blades 15 in operative position in the blade holding portions of the shear parts each blade holding portion is provided on its outer edge with a raised flange 24 which projects upwardly from the inner surface 25 of the blade holding portions substantially equal to the thickness of the replaceable blades. The raised outer edge 24 of the blade-holding portions terminates in a forward pointed undercut end at 26 a short distance below the outer extremity 27 of the blade-holding portion so that the outer end or the tip 28 of the replaceable blade projects beyond the extremity of the blade-holding portion. The inner edge of the base of each blade-holding portion is provided with a relatively short raised flange 29 of the thickness of flange 24. The inner edge of the flange 24 is adapted to be engaged by the outer edge 31 of the replaceable blade 15 and the flange 29 is adapted to be engaged by the recessed or cradle portion of the base for the blade. The flange 24 has a forward pointed terminal with an undercut end at 26 and is engaged by a recess 33 in the outer edge 31 of the blade 15 which forms the beveled barb 34 for engagement with the undercut end at the point 26. The outer end of the replaceable blades are thus prevented from moving laterally and vertically on the blade holding portions. The base portion 35 of the blades are rounded to fit into a correspondingly rounded wall-portion or cradle 36 at the point where the blade-holding portions and the handles proper of the shear parts meet. This construction facilitates the molding of the blade-holding and handle-portions of the shears and assures accuracy of fit preventing the blades from becoming disengaged, laterally and longitudinally when assembled.

The tapering portions of the rear edges of the blades and the inner edges of the flanges 24 cooperate to prevent lateral movement outwardly of the blades in the blade-holding portions of the shears and in addition to this, longitudinal movement is absolutely prevented by the fulcrum construction over the stud of which the blades are hitched and by which fulcrum the two shear parts are pivotally held together. In the base of each blade-holding portion is a round hole 38. In the hole 38 of the blade-holding portion is a molded-in metallic bushing or stud 39 having a threaded hole therein and in the hole of the blade-holding portion 14 is a molded-in metallic stud 40 having a smooth hole therein. The bushings 39 and 40 project beyond the inner surfaces 25 of the blade-holding portions in a measure substantially equal to the thickness of the blades 15, so that when the shear parts are in assembled condition, as shown in Figs. 1 and 2, the inner surfaces of the blades, the flanges and the bushings are all in perfect alignment and substantially in the same plane.

The shear parts are held pivotally connected by means 42 having a threaded end 43 adapted to be screwed into the bushing 39 and smooth cylindrical portion 44 adapted to be loosely received in the bushing 40.

In the inner end or base portion of the replaceable blades is a round hole 46 which fits snugly over the projected inner ends of the bushings 39 and 40 when the blades are in place in the blade-holding portions of the shear parts, whereby the blades are positively prevented from longitudinal movement outwardly and the base portions of the blades are prevented from movement laterally and vertically.

Fig. 4—A shows a preferred fulcrum construction comprising a hollow cylindrical fulcrum stud 41 having an abutment shoulder 37 on one end and the entire overall length being relatively greater than the overall thickness of the two blade-holding members.

This cylindrical fulcrum stud 41 is interiorly threaded in its entire length and is molded into one or the other handle and bladeholding portions rigidly providing the means around which the other handle portion having an aperture of relatively larger diameter than the outside diameter of the cylindrical fulcrum stud, rotates.

The metallic cylindrical stud molded into one handle-portion of the shears engages the non-metallic aperture in the other handle portion rotatively thus providing an association for frictional contact of dissimilar materials obviating the necessity of lubrication at that point and making operation of the shears practically noiseless.

The assembly is held in proper operating engagement by a screw member 51 having a bead portion 42 with means to be engaged by a key for locking the two handleportions into assembled operative position. This screw member 51 is threaded in its entire length.

The height of the cylindrical fulcrum stud 41 is such that when screw member 51 is tightened firmly, the bladeholding portions 13 and 14 are in close frictional contact yet turning freely without the vertical play or looseness that is the characteristic of all metal shears because of their rigid construction or nature.

The bladeholding portion having the smooth aperture for the fulcrum stud may be countersunk on the upper surface around said aperture so that the fulcrum screw when fastened properly in place is flush with the handle portion, thus precluding the possibility that the material when being cut will catch under the screwhead.

It will be observed with reference to Figs. 5 to 8, inclusive, that the blades 15 are longitudinally of substantially the same tapered contour as the blade holding portions 13 and 14, but that they are wider and that the cutting edges 22 thereof extend inwardly beyond the inner edges 47 of the blade—of the blade-holding portions, whereby the width of the body part of the blade-holding portions 13 and 14 does not interfere with the cutting action of the blades. It will be further observed that when the replaceable blades 15 are in position in the blade holding portions of the shear parts, as shown in Figs. 5 and 6, the cutting edges 22 of the blades are in line with the inner edges 48 of the flange portions 29 so that when the shears are in their fullest open position, a position they do not assume in operation, there is no shoulder or socket at the point of junction of the cutting edges of the blades to catch or hold hair or other material being cut.

In the modified form of the invention shown in Fig. 9 the blade-holding portions and blades indicated generally at 50 are offset from the handle portions 51 longitudinally so that the blades can be brought into close contact with the head of the patron without the ends of the fingers of the barber coming into contact therewith. In other words the form of the shears shown in Fig. 9 is in all other respects exactly the same in construction as the shears shown in the other figures.

It will be understood that the forms of the invention described herein and illustrated in the drawings are illustrative only and that the invention is not to be restricted to these particular forms, since it is capable of embodiment in other forms without departing from the scope and spirit of the invention, which is described to provide replaceable-blade shears or scissors mounted in handles or blade-holding portions molded from appropriate materials, such as phenolic base compounds and other synthetic materials.

A particular advantage of the replaceable-blade shears of the instant invention is the fact that it can be made more accurately, uniformly and cheaply than replaceable-blade shears heretofore proposed or attempted, since the handle and blade-holding portions are molded from such materials which, when the handles are taken from the mold, the article is highly polished requiring no further finishing than the trimming off of the fin at one point of the shearholder members of the recess and undercut where the bladeholding flange fits into the barb of the blade near its tip. The recess into which the replaceable blades fit in the handle-portions require no machining but are all substantially alike so as to receive and hold the replaceable blades in thoroughly satisfactory manner, which blades can be cheaply manufactured from spring or tool steel at a single blow of the press and require only the beveling for the barb and sharpening of the cutting edge.

Having thus described and shown the invention what I claim as new is:

1. In a pair of shears of the replaceable-blade type, a molded synthetic handle and blade-holding portion, a replaceable blade for the holder portion, the inner end of said blade holding portion of the handle having a hole, a metallic fulcrum piece molded into said hole, the inner end of said replaceable blade having a hole adapted to fit over the fulcrum piece and the replaceable blade having a beveled barb near the tip end of the blade, and holding portion of the handle having a raised rear edge, with a forwardpointed undercut to engage the beveled barb of said blade whereby the blade is prevented from moving vertically and laterally away from the blade holding portions.

2. The method of making shears having replaceable metal blades and non-metallic handles consisting of molding the non-metallic handles and blade-holding portions by a single operation and simultaneously molding the metallic fulcrum pieces into the handles, the trimming of excess of non-metallic material from the handles and holder portions appearing at the juncture of the mold section, making an undercut at tip of raised rear edge in molded blade-holding portions and thereafter attaching a replaceable blade to each holder portion.

3. In a combination of a pair of replaceable-blade shears of the character described, a flat replaceable blade having a beveled-undercut barb on its rear edge near the tip, a holder of moldable material having a holder portion for sustaining said blade comprising a flat area against which one side of the blade is adapted to rest, a raised rear edge of substantially the thickness of the blade and having a forward pointed end for receiving the beveled-undercut barb in the blade to prevent the blade from moving laterally inwardly, said holder portion having at its inner end raised portions for preventing the lateral displacement of the blade, the forward pointing undercut terminal of the raised rear edge fitting into and engaging the correspondingly shaped beveled barb of the blade to prevent vertical displacement away from the holder and a fulcrum assembly attachment for the blades and serving as a means for fastening the shear members together and holding them under slight friction in pivotal engagement when in operation and preventing the blade from moving longitudinally, said fulcrum assembly comprising a fulcrum piece molded in said holder.

4. In a pair of shears of the type wherein blade holding members are provided for supporting removable metallic blades and in which the said holding members are of moldable non-metallic material—that improvement which consists of providing a fulcrum piece of metallic material embedded in each of said holding members, an aperture in each blade, said fulcrum piece being received in said aperture, said holding member being provided with a recessed area surrounding said fulcrum piece for receiving the blade therein, whereby said blade, said fulcrum piece and said holding member are flush with each other.

5. The method of making shears having replaceable metal blades and non-metallic handles consisting of molding the non-metallic handles and blade-holding portions by a single operation and simultaneously molding the metallic fulcrum pieces into the handles, making an undercut at tip of raised rear edge in molded blade-holding portions and thereafter attaching a replaceable blade to each holder portion.

LOUIS W. SCHAAFF.